(12) United States Patent  
Dai et al.

(10) Patent No.: US 9,075,792 B2
(45) Date of Patent: Jul. 7, 2015

(54) COMPOUND SPLITTING

(75) Inventors: Andrew M. Dai, Sutton (GB); Klaus Macherey, Sunnyvale, CA (US); Franz Josef Och, Palo Alto, CA (US); Ashok C. Popat, Menlo Park, CA (US); David R. Talbot, San Francisco, CA (US)

(73) Assignee: Google Inc., Mountain View, CA (US)

( * ) Notice: Subject to any disclaimer, the term of this patent is extended or adjusted under 35 U.S.C. 154(b) by 480 days.

(21) Appl. No.: 13/026,936

(22) Filed: Feb. 14, 2011

(65) Prior Publication Data

US 2011/0202330 A1    Aug. 18, 2011

Related U.S. Application Data

(60) Provisional application No. 61/304,098, filed on Feb. 12, 2010.

(51) Int. Cl.
*G06F 17/28* (2006.01)
*G06F 17/27* (2006.01)

(52) U.S. Cl.
CPC .................. *G06F 17/2755* (2013.01)

(58) Field of Classification Search
CPC .............. G06F 17/289; G06F 17/2872; G06F 17/2827; G06F 17/2836; G06F 17/2818
USPC ........................................................ 704/1–10
See application file for complete search history.

(56) References Cited

U.S. PATENT DOCUMENTS

| 4,328,561 | A | * | 5/1982 | Convis et al. | ........... 715/257 |
| 4,672,571 | A | * | 6/1987 | Bass et al. | ............. 715/257 |
| 4,703,425 | A | * | 10/1987 | Muraki | ..................... 704/7 |
| 4,777,617 | A | * | 10/1988 | Frisch et al. | ............. 704/8 |
| 4,873,634 | A | * | 10/1989 | Frisch et al. | ........... 715/257 |
| 5,065,318 | A | * | 11/1991 | Kugimiya et al. | ........ 704/6 |
| 5,477,451 | A | * | 12/1995 | Brown et al. | ............ 704/9 |
| 5,490,061 | A | * | 2/1996 | Tolin et al. | ............... 704/2 |
| 5,619,410 | A | * | 4/1997 | Emori et al. | ............. 704/7 |
| 5,625,554 | A | * | 4/1997 | Cutting et al. | .............. 1/1 |
| 5,708,829 | A | * | 1/1998 | Kadashevich et al. | ... 715/236 |
| 5,946,648 | A | * | 8/1999 | Halstead et al. | ......... 704/9 |
| 6,092,036 | A | * | 7/2000 | Hamann | ................. 704/8 |
| 6,182,027 | B1 | * | 1/2001 | Nasukawa et al. | ....... 704/2 |

(Continued)

FOREIGN PATENT DOCUMENTS

CN    101576876 A    11/2009

OTHER PUBLICATIONS

Empirical Methods for Compound Splitting, Philipp Koehn and Kevin Knight, EACL 2003.*

(Continued)

*Primary Examiner* — Pierre-Louis Desir
*Assistant Examiner* — Fariba Sirjani
(74) *Attorney, Agent, or Firm* — Remarck Law Group PLC

(57) ABSTRACT

Methods, systems, and apparatus, including computer programs encoded on a computer storage medium, for decompounding compound words are disclosed. In one aspect, a method includes obtaining a token that includes a sequence of characters, identifying two or more candidate sub-words that are constituents of the token, and one or more morphological operations that are required to transform the sub-words into the token, where at least one of the morphological operations involves a use of a non-dictionary word, and determining a cost associated with each sub-word and a cost associated with each morphological operation.

19 Claims, 6 Drawing Sheets

(56) References Cited

U.S. PATENT DOCUMENTS

| | | | |
|---|---|---|---|
| 6,304,841 B1* | 10/2001 | Berger et al. | 704/2 |
| 6,401,060 B1* | 6/2002 | Critchlow et al. | 704/1 |
| 6,424,983 B1* | 7/2002 | Schabes et al. | 715/257 |
| 6,496,793 B1* | 12/2002 | Veditz et al. | 704/8 |
| 6,754,617 B1* | 6/2004 | Ejerhed | 704/9 |
| 6,882,970 B1* | 4/2005 | Garner et al. | 704/236 |
| 7,447,627 B2* | 11/2008 | Jessee et al. | 704/10 |
| 7,516,063 B1* | 4/2009 | Harvey et al. | 704/10 |
| 7,555,428 B1* | 6/2009 | Franz et al. | 704/10 |
| 7,583,205 B2* | 9/2009 | Fux et al. | 341/22 |
| 7,610,189 B2* | 10/2009 | Mackie | 704/9 |
| 7,634,397 B2* | 12/2009 | Suen et al. | 704/8 |
| 7,684,975 B2* | 3/2010 | Aoki et al. | 704/10 |
| 7,711,545 B2 | 5/2010 | Koehn | |
| 7,720,847 B2* | 5/2010 | Driessen et al. | 707/736 |
| 7,827,187 B2* | 11/2010 | Raman et al. | 707/750 |
| 7,860,707 B2* | 12/2010 | Yu et al. | 704/4 |
| 7,983,903 B2 | 7/2011 | Gao | |
| 8,046,355 B2* | 10/2011 | Alfonseca et al. | 707/721 |
| 8,108,391 B1* | 1/2012 | Yang et al. | 707/736 |
| 8,229,751 B2* | 7/2012 | Cheung | 704/270 |
| 8,285,541 B2* | 10/2012 | Brun | 704/9 |
| 8,332,391 B1* | 12/2012 | Heymans | 707/721 |
| 8,392,440 B1* | 3/2013 | Papachristou et al. | 707/759 |
| 8,612,205 B2* | 12/2013 | Hanneman et al. | 704/4 |
| 8,626,492 B1* | 1/2014 | Brants et al. | 704/9 |
| 8,645,119 B2* | 2/2014 | Och et al. | 704/2 |
| 2001/0009009 A1* | 7/2001 | Iizuka | 707/539 |
| 2003/0061030 A1* | 3/2003 | Kuboyama et al. | 704/9 |
| 2003/0097252 A1* | 5/2003 | Mackie | 704/9 |
| 2004/0002849 A1* | 1/2004 | Zhou | 704/4 |
| 2005/0033565 A1 | 2/2005 | Koehn | |
| 2005/0038643 A1* | 2/2005 | Koehn | 704/2 |
| 2005/0091031 A1* | 4/2005 | Powell et al. | 704/4 |
| 2006/0074987 A1* | 4/2006 | Bitsch | 707/104.1 |
| 2006/0149558 A1* | 7/2006 | Kahn et al. | 704/278 |
| 2006/0190241 A1* | 8/2006 | Goutte et al. | 704/2 |
| 2006/0200352 A1* | 9/2006 | Aizawa et al. | 704/260 |
| 2006/0277047 A1* | 12/2006 | DeBusk et al. | 704/273 |
| 2006/0285172 A1* | 12/2006 | Hull et al. | 358/448 |
| 2007/0033001 A1* | 2/2007 | Muslea et al. | 704/3 |
| 2007/0203688 A1* | 8/2007 | Fuji et al. | 704/2 |
| 2007/0250493 A1* | 10/2007 | Peoples et al. | 707/4 |
| 2008/0091413 A1* | 4/2008 | El-Shishiny et al. | 704/10 |
| 2008/0312902 A1* | 12/2008 | Dollinger | 704/4 |
| 2009/0070095 A1 | 3/2009 | Gao | |
| 2009/0091087 A1* | 4/2009 | Wasmund | 273/430 |
| 2009/0132235 A1* | 5/2009 | Liu | 704/4 |
| 2009/0216752 A1* | 8/2009 | Terui et al. | 707/5 |
| 2009/0228263 A1* | 9/2009 | Kamatani et al. | 704/4 |
| 2009/0248422 A1* | 10/2009 | Li et al. | 704/277 |
| 2009/0254572 A1 | 10/2009 | Redlich et al. | |
| 2010/0057439 A1* | 3/2010 | Ideuchi et al. | 704/7 |
| 2010/0082333 A1* | 4/2010 | Al-Shammari | 704/10 |
| 2011/0202330 A1* | 8/2011 | Dai et al. | 704/2 |
| 2012/0136651 A1* | 5/2012 | Jawerth et al. | 704/9 |
| 2012/0166181 A1* | 6/2012 | Damera-Venkata | 704/9 |

OTHER PUBLICATIONS

"Automatic Word Decompounding for ASR in a Morpholoigcally Rich Language," Audio, Speech, and Language Processing, IEEE Transactions on, Issue Date: Jul. 2009, Written by: Pellegrini, T.; Lamel, L.Ple.*

"Using a maximum entropy model to build segmentation lattices for MT," Chris Dyer, Human Language Technologies, The 2009 Annual Conference of the North American Chapter of ACL, Boulder Colorado, Jun. 2009, pp. 406-414, Association of Computational Linguistics.*

Pellegrini, T.; Lamel, L. "Automatic Word Decompounding for ASR in a Morphologically Rich Language: Application to Amharic," Audio, Speech, and Language Processing, IEEE Transactions on, Issue Date: Jul. 2009.*

Chris Dyer, "Using a maximum entropy model to build segmentation lattices for MT," Human Language Technologies, the 2009 Annual Conference of the North American Chapter of the ACL, pp. 406-414, Boulder Colorado, Jun. 2009.*

R J F Ordelman (2003) Dutch Speech Recognition in Multimedia Information Retrieval.*

Chris Dyer, Smaranda Muresan, and Philip Resnik, Generalizing Word Lattice Translation, ACL 2008.*

Alfonseca, E., et al., "German Decompounding in a Difficult Corpus", In A. Gelbukh, editor, *Lecture Notes in Computer Science (LNCS): Proc. of the 9th Int. Conf. on Intelligent Text Processing and Computational Linguistics (CICLING)*, Springer Verlag, Feb. 2008, vol. 4919, pp. 128-139.

Brown, R.D., "Corpus-Driven Splitting of Compound Words", In *Proc. of the 9th Int. Conf. on Theoretical and Methodological Issues in Machine Translation (TMI)*, Keihanna, Japan, Mar. 2002, pp. 12-21.

de Marcken, C.G., "Unsupervised Language Acquisition", Ph.D. Thesis, Massachussetts Institute of Technology, Cambridge, MA, USA, 1996, 133 pages.

Garera, N., et al., "Translating Compounds by Learning Component Gloss Translation Models via Multiple Languages", In *Proc. of the 3rd Internation Conference on Natural Language Processing (IJCNLP)*, Hyderabad, India, Jan. 2008, pp. 403-410.

Goldsmith, J., "Unsupervised Learning of the Morphology of a Natural Language", *Computational Linguistics*, Jun. 2001, vol. 27, No. 2, pp. 153-198.

Holz, F., et al, "Unsupervised and Knowledge-Free Learning of Compound Splits and Periphrases", In A. Gelbukh, editor, *Lecture Notes in Computer Science (LNCS): Proc. of the 9th Int. Conf. on Intelligent Text Processing and Computational Linguistics (CICLING)*, Springer Verlag, Feb. 2008, vol. 4919, pp. 117-127.

International Search Report from International Application No. PCT/US11/24563, mailed Apr. 8, 2011, 14 pages.

Koehn, P., et al., "Empirical Methods for Compound Splitting", In *Proc. of the 10th Conf. of the European Chapter of the Association for Computational Linguistics (EACL)*, Budapest, Hungary, Apr. 2003, vol. 1, pp. 187-193.

Marek, T., *Analysis of German Compounds Using Weighted Finite State Transducers*, Bachelor Thesis, Eberhard-Karls-Universität Tübingen, Tübingen, Germany, 2006, pp. 1-45.

Melamed, I.D., "Automatic Discovery of Non-Compositional Compounds in Parallel Data", In *Proc. of the Conf. on Empirical Methods in Natural Language Processing (EMNLP)*, Providence, Rhode Island, USA, Aug. 1997, pp. 97-108.

Poon, H., et al., "Unsupervised Morphological Segmentation with Log-Linear Models", In *Proc. of the Human Language Technologies (HLT): The 2009 Annual Conference of the North American Chapter of the Association for Computational Linguistics (NAACL)*, Boulder, Colorado, USA, Jun. 2009, pp. 209-217.

Popović, M., et al., "Statistical Machine Translation of German Compound Words", In *Lecture Notes in Computer Science (LNCS): Proc. of the 5th Int. Conf. on Natural Language Processing (FinTAL)*, Turku, Finland, Aug. 2006., vol. 4139, pp. 616-624.

Snyder, B., et al., "Unsupervised Multilingual Learning for Morphological Segmentation", In *Proc. of the 46th Annual Meeting of the Association for Computational Linguistics (ACL): Human Language Technologies (HLT)*, Columbus, Ohio, USA, Jun. 2008, pp. 737-745.

Stymne, S., et al., "Processing of Swedish Compounds for Phrase-Based Statistical Machine Translation", In *Proc. of the 12th Annual Conf. of the European Association for Machine Translation (EAMT)*, Hamburg, Germany, Sep. 22-28, 2008, vol. 1, pp. 180-191.

* cited by examiner

COMPOUND SPLITTING

CROSS-REFERENCE TO RELATED APPLICATION

This application claims the benefit under 35 U.S.C. §119(e) of U.S. Patent Application No. 61/304,098, filed Feb. 12, 2010, which is incorporated by reference herein in its entirety.

BACKGROUND

This specification generally relates to decompounding.

Many languages, e.g., English, German and Swedish, use compound words in order to increase vocabulary size, where a compound word is a combination of two or more words that functions as a single unit of meaning, or a lexeme that includes two or more constituents, parts or morphemes. In some languages, the generation of a compound word from its constituent lexemes (or "constituents," or "sub-words") requires one or more morphological operations.

Compound splitting (or "decompounding") refers to a process of splitting a compound word into its corresponding constituents (e.g., compound parts). While a person familiar with the language can usually recognize and split a compound word into its constituents, the morphological operations that transform constituents make it far more difficult for a machine to perform these same tasks.

When performing machine translations, a phrase-based statistical process may be used to align source and target phrases using a phrase table. The phrase table stores multilingual information that the machine can use to align the source and target phrases. In the case where one of the languages has the ability to generate compound words and the other language does not, alignment of source and target phrases may be difficult or impossible.

SUMMARY

This specification describes techniques by which a compound splitting system can decompound a compound word into its constituents Compound splitting can achieve improved correspondence between source and target phrases, thereby improving the quality of a machine translation. In general, a compound splitting system can be trained to decompound compound words using word frequency lists derived from monolingual data. Additionally, a multilingual phrase table can also be used by the universal compound splitting system in order to, for example, learn morphological operations needed to decompound words in particular languages. When the compound splitting system has been trained, it can obtain a token that includes a sequence of characters, e.g., a compound word, and decompound the token into its constituents.

In general, one innovative aspect of the subject matter described in this specification may be embodied in methods that include the actions of obtaining a token that includes a sequence of characters, identifying two or more candidate sub-words that are constituents of the token, and one or more morphological operations that are required to transform the sub-words into the token, where at least one of the morphological operations involves a use of a non-dictionary word, and determining a cost associated with each sub-word and a cost associated with each morphological operation. Other embodiments of this aspect include corresponding systems, apparatus, and computer programs, configured to perform the actions of the methods, encoded on computer storage devices.

These and other embodiments may each optionally include one or more of the following features. For instance, the actions may include combining the cost associated with each sub-word with the cost associated with each morphological operation; the actions may include determining to decompound the token into the candidate sub-words based on the combined costs, where determining to decompound the token may include determining to decompound the token into the candidate sub-words when the combined cost satisfies a predefined threshold; determining to decompound the token may include determining to decompound the token into the candidate sub-words when the combined costs is a lowest combined cost associated with all identified combinations of candidate sub-words that are constituents of the token; the actions may include determining a quantity of split points between the sub-word, and determining a cost associated with the quantity of split points; the at least one morphological operation may involve inserting the non-dictionary word between two of the candidate sub-words, deleting of the non-dictionary word from the token, prepending the non-dictionary word as a prefix of one or more of the candidate sub-words, postpending the non-dictionary word as a suffix of one or more of the candidate sub-words, or inserting the non-dictionary word as an infix to one or more of the candidate sub-words; the non-dictionary word may be a linking morpheme that includes a sub-sequence of the characters that has no defined meaning in the language of the sub-words.

In general, another innovative aspect of the subject matter described in this specification may be embodied in methods that include the actions of identifying words that occur in a first vocabulary, and a frequency with which each respective word occurs in the first vocabulary, decompounding words that occur in a second vocabulary using the words that occur in the first vocabulary as constituents, and outputting, as a universal compound splitter vocabulary, the words that occur in the first vocabulary that were used as constituents to decompound the words that occur in the second vocabulary. Other embodiments of this aspect include corresponding systems, apparatus, and computer programs, configured to perform the actions of the methods, encoded on computer storage devices.

These and other embodiments may each optionally include one or more of the following features. For instance, the first vocabulary may be a news language model vocabulary, and the second vocabulary may be a web language model vocabulary; the actions may include selecting the words that occur in the first vocabulary that were used as constituents more than a predetermined number of times to decompound the words that occur in the second vocabulary, where outputting, as the universal compound splitter vocabulary, the words that occur in the first vocabulary that were used as constituents to decompound the words that occur in the second vocabulary may include outputting the selected words that occur in the first vocabulary that were used as constituents more than a predetermined number of times to decompound the words that occur in the second vocabulary; the actions may include filtering words from the universal compound splitter vocabulary based on the frequency with which each respective word occurs in the first vocabulary.

In general, another innovative aspect of the subject matter described in this specification may be embodied in methods that include the actions of identifying words that occur in a first vocabulary, and a frequency with which each respective word occurs in the first vocabulary, decompounding words that occur in a second vocabulary using the words that occur in the first vocabulary as constituents, outputting, as a universal compound splitter vocabulary, the words that occur in the first vocabulary that were used as constituents to decompound the words that occur in the second vocabulary, obtaining a token that includes a sequence of characters, identifying two or more candidate words that occur in the universal compound splitter vocabulary and that are constituents of the token, and one or more morphological operations that are required to transform the words into the token, where at least one of the morphological operations involves a use of a non-dictionary word, and determining a cost associated with each word and a cost associated with each morphological operation, where the cost associated with each word corresponds with the frequency with which the respective word occurs in the first vocabulary. Other embodiments of this aspect include corresponding systems, apparatus, and computer programs, configured to perform the actions of the methods, encoded on computer storage devices.

In general, another innovative aspect of the subject matter described in this specification may be embodied in methods that include the actions of obtaining a multi-lingual phrase table of phrase-pairs, the phrase table comprising phrase pairs identifying source words or phrases in a non-English source language, and English words or phrases that are translations of the respective source words or phrases, identifying, using the phrase table, one or more single-token words which translate into multi-token English phrases, for each identified single-token source word, obtaining translations for each token of a corresponding multi-token English translation, and determining that one or more of the identified single-token source words are likely to be compound words based on the obtained translations. Other embodiments of this aspect include corresponding systems, apparatus, and computer programs, configured to perform the actions of the methods, encoded on computer storage devices.

These and other embodiments may each optionally include one or more of the following features. Determining that one or more of the identified single-token source words are likely to be compound words comprises determining that the obtained translations corresponding to a particular single-token source word at least partially match the particular single-token source word. Extracting morphological operations for the non-English source language based on the single-token source words that are likely to be compound words and the obtained translations. The morphological operations are extracted based at least in part on a Levenshtein distance between a particular single-token source word that is likely to be a compound word and the obtained translations corresponding to the particular single-token source word.

In general, another innovative aspect of the subject matter described in this specification may be embodied in methods that include the actions of storing entries in a language-dependent word frequency list, wherein each entry includes data that identifies a fingerprint of a word, and data that identifies a frequency of occurrence of the respective word in a one or more languages, obtaining a candidate compound, and determining a frequency of occurrence associated with the candidate compound based on matching the candidate compound with one of the fingerprints. Other embodiments of this aspect include corresponding systems, apparatus, and computer programs, configured to perform the actions of the methods, encoded on computer storage devices. These and other embodiments may each optionally include one or more of the following features. For instance, the entry may be a 64-bit entry, the data that identifies the fingerprint of the word may include 40-bits, and the data that identifies the frequency of occurrence of the respective word in one or more languages may include 24-bits.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
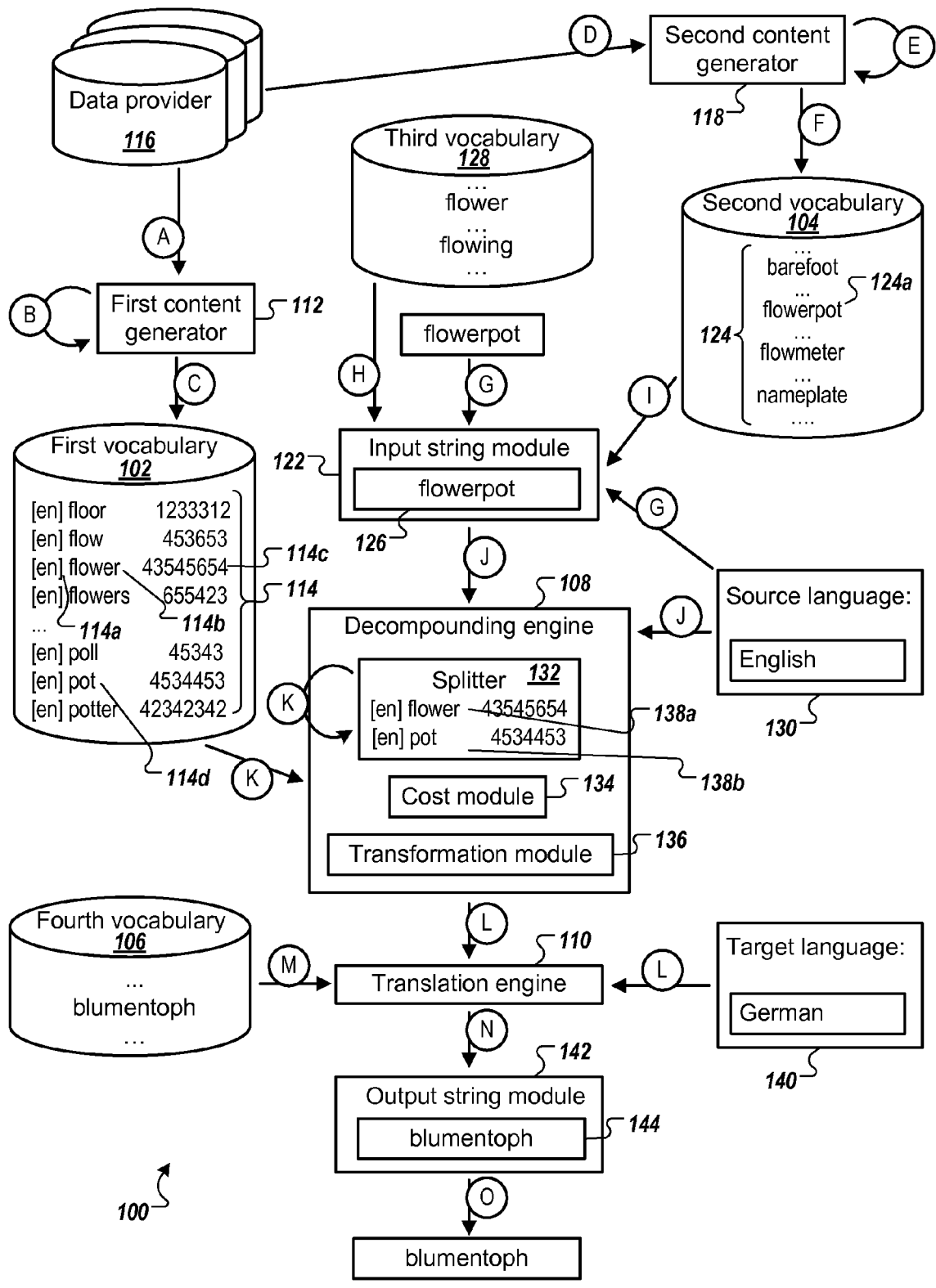
FIG. 1 is a diagram demonstrating the splitting of a compound word in a source language into its constituents for translation to a target language.

FIG. 1 is a diagram demonstrating the splitting of a compound word in a source language into its constituents for translation to a target language by a universal compound splitting system 100. The system 100 includes vocabulary databases 102, 104, 106, and 128, data provider database 116, decompounding engine 108, and translation engine 110. FIG. 1 further illustrates the flow of data between the components of the system 100 during states "A" to "O," which are not necessarily time sequenced. While the vocabulary databases 102, 104, 106 and 128 are shown as being separate databases, in some implementations, two or more of the vocabularies 102, 104, 106, and 128 can be stored in the same database.

The system 100 uses a list of constituents (e.g., found in a compounding dictionary) as an input to a compound splitter 132.

In one example instance, the recognition of the split points can be based on the data (e.g., a constituent list) available to the decompounding process. In some cases, a specific compound word (e.g., a proper name) may not be split but left intact as the meaning of the compound word is lost if it is split into its constituents. In other cases the constituent list can be filtered to exclude specific constituents, or the decompounding process can include recognition of specific phrases that the process will not recognize as compound words.

The decompounding engine 108 performs compound splitting of compound words for two or more different languages using a constituent probability model in a compound splitting process. The compound splitting process can be implemented using dynamic programming. Each of the languages can exhibit morphologies of various complexities, where the morphology for one language may be more complicated than that of another language. For example, the languages can include, but are not limited to, English, German, Swedish, Greek, Hungarian and Chinese, each of which exhibit different morphologies. The compound splitting process uses a constituent list (e.g., a compound word dictionary that includes the constituents of the compound words) in order to determine the two or more constituents of a compound word. The constituent list is the result of identified compound word constituents extracted from large corpora (e.g., an automated news aggregator or a dictionary associated with a data provider database 116).

Further, the decompounding engine 108 learns specific morphological operations for each language in order to successfully split a compound word into its constituents in that particular language. In some implementations, the decompounding engine 108 can learn the morphological operations using multilingual information for languages supported by the decompounding process stored in a phrase table. For example, the phrase table can be derived from a statistical machine translation system that supports translations between a number of different languages.

As illustrated in FIG. 1, the system 100 is shown with respect to an example of translating the compound word "flowerpot" from English to German. First content generator 112 receives language model vocabulary lists for multiple languages from the data provider databases 116 in state "A". In some implementations, the data provider databases 116 include an automated news aggregator (e.g., a database that includes an aggregate of news articles). Thus, the language model vocabulary list is an aggregate of words used in a particular language, as derived from news articles. In some other implementations, the data provider databases 116 include a language model vocabulary list provided by a dictionary database.

The first content generator 112 derives a word frequency list from the language model vocabulary lists for multiple languages, in state "B". The word frequency list includes a list of possible constituents of a compound word. The first content generator 112 provides a first vocabulary list in the form of a single shard table for storage in database 102 in state "C". A first partial vocabulary list 114 is an example subset of English language entries in the word frequency list. A table entry includes a language code 114a (e.g., "en" for English), a word 114b (e.g., "flower") in the language designated by the language code 114a, and a frequency count 114c (e.g., 43,545,654) representing the frequency of occurrence of the word 114b in the language model vocabulary list. The frequency count 114c can represent the number of occurrences of the word 114b in the language model vocabulary list. For example, the frequency count is determined by performing a dictionary lookup or by looking at news articles provided by an automated news aggregator.

Second content generator 118 also receives language model vocabulary lists for multiple languages from the data provider databases 116 in state "D". The second content generator 118 derives a compound word list from the language model vocabulary lists for the multiple languages in state "E". The second content generator 118 provides a second vocabulary list for storage in database 104 in state "F". A second partial vocabulary list 124 is an example subset of English language entries in the compound word list.

A user operating a client device may enter an input string (e.g., "flowerpot") for translation in a data entry box included in a graphical user interface displayed to the user on a display device. The user may select the source language for the input string (e.g., English) and the target language for the translation (e.g., German). The user may then activate a translate button. In response to the activation of the translate button, input string module 122 receives input string 126 (e.g., "flowerpot") and the source language selection 130 (e.g., English) for the input string 126 in state "G". An example of the client device and its operating environment is described with reference to FIG. 3.

The input string module 122 compares the input string 126 to the contents of the database 128 for the source language in state "H". Database 128 includes a third vocabulary that is a phrase table for each language supported by the universal compound splitting system 100. If no entry exists for the input string 126 in the database 128, the input string module 122 compares the input string 126 to the contents of the database 104 for the source language in state "I". Database 104 contains a compound word list that includes the input string 126 (e.g., "flowerpot" at database entry 124a). In state "J", the decompounding engine 108 receives the input string 126 and the source language selection 130.

As shown in FIG. 1, the decompounding engine 108 includes compound word splitter 132, cost module 134 and transformation module 136. The splitter 132 performs the splitting of a compound word (e.g., input string 126) into its constituents. The constituents can include one or more non-dictionary words. The splitter 132 can use a dynamic program model-based compound splitting process to identify a desired split sequence (number and location of split points and constituents) for the compound word (input string 126).

In state "K", the splitter 132 executes a recursive compound splitting process to determine the desired split sequence for the input string 126. The compound splitting process uses the word frequency list included in database 102 for the source language of the input string 126 (e.g., English) to determine split points and constituents for the input string 126. The compound splitting process recursively attempts different split points within the input string 126, resulting in various candidate constituents and split sequences. The cost module 134 calculates a total probability or cost for the split sequence for each decompounding attempt by the splitter 132. The total probability for a split sequence includes, among other things, the sum of the frequency counts for each constituent determined by the number and location of split points.

The cost module 134 determines the desired split sequence for the input string 126 to be the split sequence for the input string 126 that produces the highest total frequency count. The desired split sequence may or may not be the optimal split sequence. In some implementations, a total cost is associated with a split sequence, where the higher the probability (the larger the total number of frequency counts) for the split sequence, the lower the total cost is for the split sequence.

The decompounding engine 108 using the splitter 132 and the cost module 134 determines that the desired split sequence for the input string 126 (e.g., "flowerpot") results in two constituents: constituent 138a (e.g., "flower) and constituent 138b (e.g., "pot"). A dictionary for the source language can include the constituents 138a, 138b, where each separate constituent is a dictionary word used in the source language (e.g., "flower" and "pot" are found in an English dictionary and each word alone can be used in the language). In some implementations, one or more of the constituents may be a word that is not included a dictionary for the source language of the compound word. In this case, the transformation module 136 can transform the non-standard word constituent into a standard word (e.g., by adding a prefix and/or a suffix to the non-standard word constituent, by changing one character in the constituent to another character, etc.) that can later be easily translated. For example, the constituents of the Greek word "χαρτοπαίζω" are "χαρτο" and "παίζω," but "χαρτο" is not commonly found in Greek dictionaries. The transformation module 136 can transform the non-standard word constituent "χαρτο" into the standard word constituent χαρτιά by removing suffix "o" and replaced it with the suffix "ια"

In state "L", the translation engine 110 receives the decompounded constituents (constituent 138a (e.g., "flower) and constituent 138b (e.g., "pot")) for the desired split sequence determined by the decompounding engine 108 and a target language selection 140. In state "M", the translation engine 110 translates the constituents 138a, 138b from the source language to the target language. In particular, for the example shown, constituents 138a, 138b ("flower" and "pot", respectively, or the phrase "flower" "pot") are translated from English to German. The translation engine 110 uses database 106, which includes a fourth vocabulary that is a translation dictionary for the source language to the target language (e.g., English to German dictionary). The translation engine 110 compares the constituents 138a, 138b with entries in the dictionary in order to find the translation of the constituents 138a, 138b from the source language (e.g., English) into the target language (e.g., German). In state "N", an output string module 142 receives the translated output string 144 (e.g., "blumentoph"), which is the translation of the decompounded input string 126 (e.g., "flower pot") from the source language (e.g., English) to the output string 144 (e.g., "blumentoph") in the target language (e.g., German).

For example, in state "O", the user may view the output string 144 in an output box included in a graphical user interface displayed to the user on the display device of the same computing device used by the user to enter the input string for translation. An example of the computing device and its operating environment will be described with reference to FIG. 3.

As described in FIG. 1, a word frequency list (e.g., first partial vocabulary list 114, which is an example subset of English language entries in a word frequency list) provides a source of constituents used by the compound splitting process executed by the splitter 132. The word frequency list is language dependent and includes a list of stored constituent candidates extracted from monolingual data. The first content generator 112 can generate a word frequency list for each language supported by the universal compound splitting system 100. The universal compound splitting system 100 can be trained to extract constituent candidates from language model vocabulary lists (e.g., language model vocabulary lists provided by data provider databases 116) to generate a word frequency list.

In some implementations, the universal compound splitting system 100 combines one or more filter steps with the extraction of the constituent candidates from the language model vocabulary lists in order to generate a word frequency list. The decompounding engine 108 uses the word frequency list as a universal compound splitter vocabulary. The universal compound splitting system 100 uses a training procedure, divided into four phases, where the system 100 automatically applies one or more filter steps to the phases to generate a word frequency list for all languages that can be stored in database 102.

Figure 2:
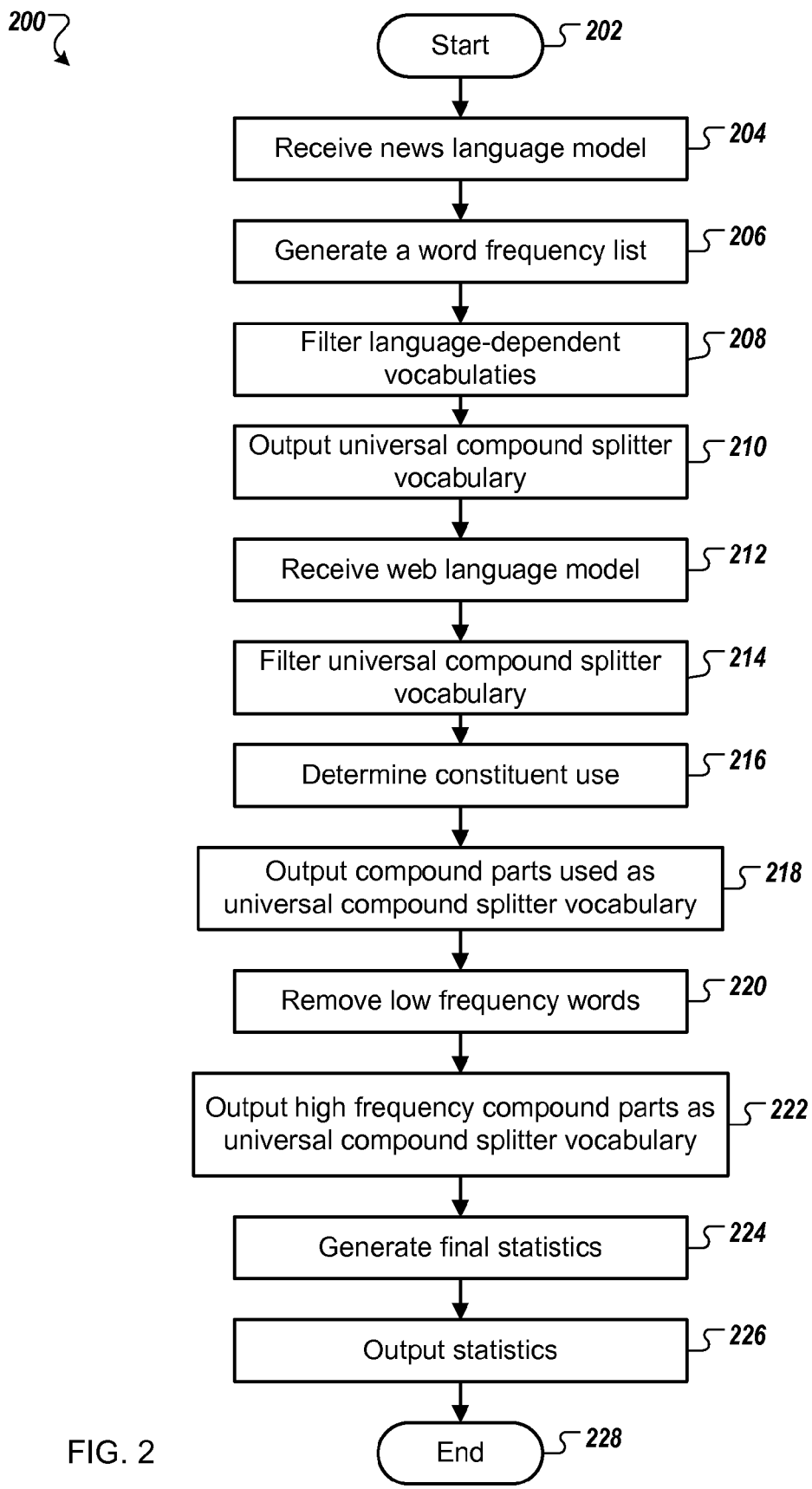
FIG. 2 is a flow chart of an example training procedure process for the monolingual extraction of constituents for multiple languages.

FIG. 2 is a flow chart of an example training procedure process 200 for the monolingual extraction of constituents for multiple languages. The process 200 can be performed by one or more computing devices. For example, a universal compound splitting system (e.g., the universal compound splitting system 100 of FIG. 1) can be used to perform the process 200.

For example, referring to FIGS. 1 and 2, the process 200 begins (202) when a news language model vocabulary is received (204). The news language model vocabulary can be included in a database (e.g., database 116). A first content generator (e.g., the first content generator 112) generates a word frequency list derived from a news language model vocabulary for the languages supported by the universal compound splitting system (206).

News articles can provide a database of language-dependent vocabularies resulting in a news language model vocabulary that contains words with fewer spelling errors than a model vocabulary based on general web text. Additionally, the news articles can provide a news language model vocabulary that is less noisy, e.g., that contains fewer incorrect or non-dictionary words.

The first content generator filters the language-dependent vocabularies included in the news language model vocabulary according to a sequence of one or more filter steps (208) performed during a mapreduce process. During the mapreduce process, first content generator performs a reduce process that aggregates a number of counts related to the frequency of the occurrence of each word or token in the language-dependent vocabularies. The reduce process further reduces the size of the language-dependent vocabularies included in the news language model vocabulary to include entries that may be potential constituents of a compound word. For example, a first filter step can filter out proper names (e.g., Michelle, Washington, Pentagon, etc.).

The universal compound splitting system outputs a universal compound splitter vocabulary (210). The universal compound splitter vocabulary can be output as a single shard table for storage in a database (e.g., database 102). A first partial vocabulary list (e.g., first partial vocabulary list 114) shows table entries for a particular language code. A table entry can be entered in a format that includes a language code (e.g., "en" for English), a word (e.g., "flower") in the language designated by the language code, and a frequency count (e.g., 43,545,654 for word 114b "flower") representing the frequency of occurrence of the word in the database.

In some implementations, the single shard table includes entries for each of the languages supported by the universal compound splitting system. A sequence start entry is placed at the beginning of each sequence of language codes for a language. The sequence start entry includes a count that indicates the number of subsequent table entries for a specific language code. An example of a sequence start entry for the English language entries in the database is:

[en] \0###!!!NumberOfEntries!!!###->nnnnn where "[en]" is the language code (English) and the count "nnnnn" indicates the number of subsequent table entries for the English language. The leading "0" in the sequence start entry ensures the entry precedes all other entries for the language code.

A web language model vocabulary is received (212). The web language model vocabulary can be included in a database (e.g., database 116). The universal compound splitting system further reduces and filters the word frequency list (the universal compound splitter vocabulary) (214).

The web language model vocabulary is based on arbitrary web texts for each language supported by the universal compound splitting system. The web language model vocabulary includes entries for each supported language. The universal compound splitting system uses a map step of the mapreduce process to split the received web language model vocabulary.

The universal compound splitting system uses the word frequency list stored in the database (e.g., database 102) as input to a splitter (e.g., splitter 132). A decompounding engine (e.g., decompounding engine 108) attempts to split the words included in the web language model vocabulary. The universal compound splitting system passes the compound constituents included in the word frequency list used by the splitter to split an input compound word from the web language model vocabulary to a reducer.

The reducer determines how often each constituent in the word frequency list is used (216). The reducer outputs the constituents whose use exceeds a predetermined threshold level to be used as a universal compound splitter vocabulary (218). This can further reduce the size of the word frequency list. In some implementations, the reducer is included in the decompounding engine. In some implementations, the reducer is a module included in the universal compound splitting system.

For example, the output of the first content generator includes the first partial vocabulary list. As part of filtering the first partial vocabulary list, the decompounding engine receives an input string (e.g., input string 126 "flowerpot") where the input string is included in the web language model vocabulary. Using the first partial vocabulary list as input to the splitter, the constituents included in the first partial vocabulary list used by the splitter to split the input string "flowerpot" are the word "flower" and the word "pot". In this example, if no additional words are split and the predetermined threshold level for the reducer is equal to one, the output of the reducer will include the partial vocabulary list:

```
[en] \0###!!!NumberOfEntries!!!### -> 2
[en] flower -> 43545654
[en] pot -> 4534453
```

The output of the reducer includes constituent candidates that the decompounding engine uses to split compound words included in the web language model vocabulary. The addition of a predetermined threshold level for use by the reducer further ensures that the decompounding engine uses the constituent candidates frequently enough to be included in the word frequency list.

In some implementations, the universal compound splitter vocabulary initially includes compound words. Assuming the use of constituents is greater than the use of compound words by the decompounding engine, the compound words can be filtered from the word frequency list.

The universal compound splitting system can remove words from the word frequency list whose frequency counts are below a predetermined threshold level (220). In some implementations, the size of the word frequency list can be further reduced. The universal compound splitting system provides a final word frequency list in a single shard table that can be used as a universal compound splitter vocabulary (222).

In some implementations final statistics are generated (224) and output (226). For example, the statistics can be used to compare the number of constituents across languages. In another example, the statistics can be used for error analysis of the universal compound splitting system. The process 200 ends (228).

In some implementations, compound word candidates and their constituents are included in a bilingual environment. In a bilingual universal compound splitting system, a compound word is split into its constituents and then translated from a source language into a target language. For example, English can be the source language and a phrase table can provide translations from the source language (English) to a target language. In another example, English can be the target language and a phrase table can provide translations from a source language to English.

The bilingual universal compound splitting system can, as part of a training procedure, automatically generate or obtain a translation phrase table. A subsequent phase of the training procedure executed by the bilingual universal compound splitting system operates under an assumption that English does not include many compound words. Therefore, the execution of the training phase can involve searching the translation phrase table for single token source words, f, in a language, l, which translate into multi-token English phrases, $e_1, \ldots, e_n$. The single token source word, f, and its translated multi-token English phrase, $e_1, \ldots, e_n$, can form a phrase pair (f, $e_1, \ldots, e_n$). Each phrase pair can be a candidate for the translation of the single token source word, f, in language, l, to its English multi-token phrase translation, $e_1, \ldots, e_n$.

The bilingual universal compound splitting system can take each token, $e_i$, included in the multi-token English phrase, $e_1, \ldots, e_n$, and lookup, in a vocabulary database (e.g., database 106 in FIG. 1), the corresponding translation of the individual token, $e_i$, for the language, l. In a bilingual extraction process, the bilingual universal compound splitting system can find entries in the vocabulary database that at least partially match the original source word, w, where the original source word, w, is a compound word. Including the additional lookups in the vocabulary database, Equation (1) can represent a form of the translation pairs resulting from a bilingual extraction process.

$$PT_{CS}(f) = (f; e_1, \ldots, e_n; g_1, \ldots, g_n) \quad (1)$$

In Equation (1), $PT_{CS}(f)$ is the translation pair for the source word, f, which in this case is likely to be a compound word. The multi-token English phrases, $e_1, \ldots, e_n$, comprise the English translation of the source word, f, and $g_1, \ldots, g_n$, are the constituent parts of the source word, f. A $PT_{CS}$ table can include entries for multiple single token source words, f, In some implementations, the generating of the translation phrase table automatically during a training procedure can introduce errors into the translation phrase table (e.g., the inclusion of incorrect words). The bilingual extraction process can also introduce a certain amount of noise or errors into the decompounding process. However, in some implementations, the bilingual extraction process can be a better indicator of possible compound words together with their constituent parts than the monolingual extraction process described in FIG. 1. The bilingual universal compound splitting system can use the tuples defined in Equation (1) (e.g., (f; $e_1, \ldots, e_n$; $g_1, \ldots, g_n$)) to automatically extract one or morphological transformations that may be needed when combining the constituent parts, $g_1, \ldots, g_n$, together to form the compound word, f. For example, the bilingual universal compound splitting system can use the tuples defined in Equation (1) to automatically extract any linking morphemes that may be needed for combining the constituent parts of a compound word, f.

Monolingual and bilingual universal compound splitting systems can use training procedures to generate final word lists (e.g., a word frequency list and a translation phrase table, respectively) for use in a compound word translation process. The phases of the training procedure can use one or more filter steps to control the size of the final word lists as well as to ensure the quality of the final word lists. One factor contributing to the quality of the final word lists in the inclusion of one or more invalid constituent parts. Another factor contributing to the quality of the final word lists is the exclusion of one or more valid constituents.

In some implementations, a universal compound splitting system includes a white list and a black list (or "stop list"). For example, the white list can include one or more words (e.g., constituents, constituents, compound words) that the system always includes in the final word list. For example, a black list can include one or more words (e.g., constituents, constituents, compound words) that the system always excludes or usually excludes from the final word list. For example, black lists and white lists can be used to learn or train the parameters or thresholds of a universal compound splitting system to improve the system's overall performance.

In some implementations, the creation of a compound word includes one or more morphological operations. For example, the German compound word, Verkehrszeichen (English translation: traffic sign) consists of two nouns, Verkehr (traffic) and Zeichen (sign). The creation of the compound word, Verkehrszeichen, includes an additional morphine, the s-morphene, which can be referred to as a linking morphene as it "links" together the two constituents, Verkehr and Zeichen, of the compound word, Verkehrszeichen. Creating the compound word, Verkehrszeichen, involves an additional morphological operation, namely the insertion of the character "s" between the two constituents, Verkehr and Zeichen. However, the character "s" is not a dictionary word, since, on its own, it has no meaning in the German language.

Morphological operations for the German language can involve the insertion and deletion of characters included in a small set of candidate characters. In other languages (e.g., Greek, Hungarian) the morphological operations can be more complex (e.g., larger set of candidate characters, substitution of one or more characters in a constituent, etc.). A universal compound splitting system can include a candidate set of characters to select from for use in morphological operations. A universal compound splitting system can learn, for example through phases of a training procedure, how to detect linking morphemes and other additional morphological operations used to create a compound word for a particular language.

In some implementations, a morphological operation includes a pair (s, t) of strings, s, t 0 A*, where string, s, is replaced by string, t, and the one or more characters in the strings s and t are included in the source language alphabet, A. The Kleene operator, "*", operates on the source language alphabet, A, where strings s and t can be empty (null) strings, denoted by the symbol "ϵ". Using the Kleene * operator, where each string, s, t, is a set of characters, results in A* as the set of all strings over symbols in A, including the empty string.

An example string pair for a morphological operation in the German language is (es, ϵ), which models the linking morpheme, es, in the German compound word Bundesagentur (English translation: federal agency) to an empty string, ϵ. The constituents of the compound word, Bundesagentur, are Bund (federal) and agentur (agency), and "es" is the linking morpheme.

In some implementations, in order to learn the morphological operations used to create a compound word from one or more constituent parts (sub-words), a universal compound splitting system determines the differences between a compound word and its constituents. The system can apply a distance metric (e.g., the Levenshtein distance), to measure the amount of differences between two sequences (strings) with allowable edit operations being the insertion, deletion, or substitution of a single character. The universal compound splitting system stores the edit distance and the edit operation. The Levenshtein distance provides the morphological operations required for compounding. The system applies inverse operations (e.g., replacing string t with string s) resulting in the operation required for decompounding of the compound word. Each morphological operation has an associated "cost".

The Levenshtein distance assumes edit operations that have uniform costs. However, in some implementations, uniform costs are desired for learning morphological operations for decompounding making the costs the same for all languages. In some implementations, the costs are set per language where languages that are more complex may incur higher operation costs.

Using the translation pairs in Equation (1), the universal compound splitting system can apply the Levenshtein distance to both the compound word (f) and its constituents $(g_1, \ldots, g_n)$ to extract one or more morphological operations in a learning process that can be a part of training a universal compound splitting system. For example, to avoid learning spurious and singleton operations (e.g., caused by spelling errors), the universal compound splitting system can explicitly count how often each identified morphological operation is used. The system can retain operations whose use count exceeds a given predefined threshold value.

Figure 3:
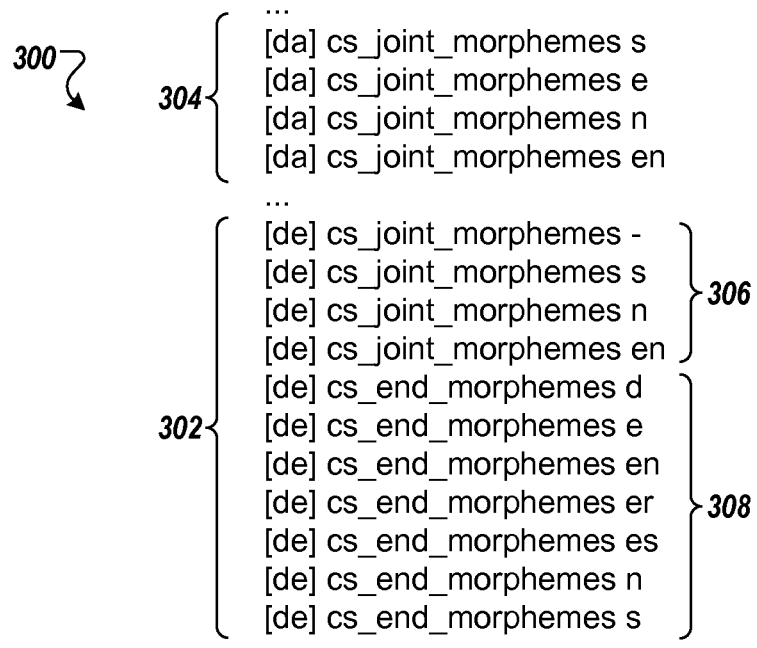
FIG. 3 is a partial list of morphemes used for compound splitting by a universal compound splitting system.

FIG. 3 is a list 300 of example morphemes used for compound splitting by a universal compound splitting system. The list 300 can include morphemes that the universal compound splitting system explicitly specifies. The list 300 can also include morphemes learned by the system, for example, through phases of a training procedure as previously described. The list 300 includes morphemes 302 and 304 used for the German (de) and Dutch (da) languages, respectively. In some implementations, morphemes for additional languages can be included in the list 300, where these morphemes may include non-dictionary words.

The German morphemes 302 include linking morphemes 306. For example, the linking morphemes 306 can occur between two sub-words of a German compound word. If the universal compound splitting system restricts the Levenshtein operations used by a phase of the training procedure to include insertions only (e.g., the costs for deletions and substitutions are set to infinity), the output of the phase of the training procedure can include the list of linking morphemes 306.

In morphologically rich languages (e.g., Greek, Hungarian) learning morphemes using a training procedure can be difficult as the morphological operations can involve deletions and substitutions as well as insertions. Linking morphemes are an example of insertions. The universal compound splitting system can use the translation pairs in Equation (1) to extract one or more morphological operations in a learning process that can be a phase of a training procedure. The quality of the translation pairs included for the single token source words, f, in the $PT_{CS}$ table can influence the learning of the full range (insertions, deletions and substitutions) of morphological operations. Each single token source word, f, can have multiple translations, which adds to the difficulty of the selection of the translation pairs. In addition, the correct translation for a single token source word, f, may not be included in the $PT_{CS}$ table.

In some implementations, the universal compound splitting system refines the extraction process used to determine the entries for the $PT_{CS}$ table. For example, in a first step, the system can assume languages that include compound words have a large number of compound words formed by directly concatenating their constituents without the use of any additional morphological operations. This assumption can provide a first group of reliable constituents for inclusion in a universal compound splitter vocabulary. In a second step, the system allows compound words to be formed using a single morphological operation, e.g., making insertions using linking morphemes, and the constituents added to the universal compound splitter vocabulary determined in the first step.

In one example implementation, the system only considers compound words that contain two constituents, which translate from their source language into two English words. Additionally, insertions that occur at the beginning of the first constituent or the end of the last constituent can be morphological variations of the respective constituents themselves. These identified morphological variations of the constituents are added to the universal compound splitter vocabulary. Additional insertion operations in the compound word are considered linking morphemes. The system can add any additional learned linking morphemes to the list of morphemes used for compound splitting by the universal compound splitting system. For example, in a third step, the universal compound splitting system can use the updated universal compound splitter vocabulary and the updated list of morphemes from the second step to perform decompounding and translation operations on a compound word that may include one or more morphological operations.

In some other implementations, and referring to FIG. 1, a splitter (e.g., splitter 132) can use a dynamic program model based compound splitting process to determine the desired split sequence (e.g., a number and location of split points and constituents) for an input compound word. The splitter can receive an input compound word, token $w = c_1 \ldots = c_N = c_1^N$, where $c_1^N$ is a sequence of characters. The splitter can use the dynamic program model based compound splitting process to determine the desired sequence of split points, $\hat{n}_0^{\hat{K}}$, such that the constituents are constituents of the token, w, where $n_0 := 0$, $n_K := N$, and $p(n_0) = p(n_K | \bullet) = 1$.

$$w = c_1^N \rightarrow \left(\hat{K}, \hat{n}_0^{\hat{K}}\right) = \underset{K, n_0^K}{\operatorname{argmax}}\{Pr(c_1^N, K, n_0^K)\} \quad (2)$$

$$w = c_1^N \rightarrow \left(\hat{K}, \hat{n}_0^{\hat{K}}\right) = \underset{K, n_0^K}{\operatorname{argmax}}\{Pr(K) \cdot Pr(c_1^N, n_0^K | K)\} \quad (3)$$

$$w = c_1^N \rightarrow \left(\hat{K}, \hat{n}_0^{\hat{K}}\right) = \underset{K, n_0^K}{\operatorname{argmax}}\left\{ p(K) \cdot \prod_{k=1}^{K} p\left(c_{n_{k-1}+1}^{n_k}, n_{k-1} | K\right) \cdot p(n_k | n_{k-1}, K) \right\} \quad (4)$$

Equation (2) requires that the splitter completely split the token, w, into a sequence of lexemes, which are the constituents. Therefore, the splitter can find the constituents and determine the desired segmentation for the token, w. In some implementations, the constituents of the compound word in the source language of the token, w, (e.g., a Germanic language) are lexemes. In some implementations, the constituents of the compound word in the source language of the token, w, may not be valid words (i.e., may be non-dictionary words). For example, in Greek the constituents used in Equation (4) may not be valid words included in a Greek dictionary. In this case, the splitter can split the token, w, into constituents that may not be valid dictionary words. A transformation module (e.g., the transformation module 136) included in the decompounding engine (e.g., decompounding engine 108) can transform each non-dictionary word constituent into a lexeme. The transformed lexemes are denoted by $g_1^K$. The decision rule can be refined as shown in Equations (5), (6), and (7).

$$w = c_1^N \rightarrow \left(\hat{K}, \hat{n}_0^{\hat{K}}, \hat{g}_1^{\hat{K}}\right) = \underset{K, n_0^K, g_1^K}{\operatorname{argmax}}\{Pr(c_1^N, K, n_0^K, g_1^K)\} \quad (5)$$

$$w = c_1^N \rightarrow \left(\hat{K}, \hat{n}_0^{\hat{K}}, \hat{g}_1^{\hat{K}}\right) = \underset{K, n_0^K, g_1^K}{\operatorname{argmax}}\{Pr(K) \cdot Pr(c_1^N, n_0^K, g_1^K | K)\} \quad (6)$$

$$w = c_1^N \rightarrow \left(\hat{K}, \hat{n}_0^{\hat{K}}, \hat{g}_1^{\hat{K}}\right) = \underset{K, n_0^K, g_1^K}{\operatorname{argmax}}\left\{ p(K) \cdot \prod_{k=1}^{K} p\left(c_{n_{k-1}+1}^{n_k}, n_{k-1} g_1^K | K\right) \cdot p(n_k | n_{k-1}, K) \right\} \quad (7)$$

The constituent probability, represented by $p(c_{n_{k-1}+1}^{n_k}, n_{k-1}, g_1^K | K)$, is a zero order model. The constituent probability is dependent on the number of splits, K. The decompounding engine can penalize each split identified by the splitter with a constant split penalty, $\zeta$. The probability can then be independent of the number of splits, K. Equation (8) can represent a decision rule used to determine the split points in a compound word where the constituent probability is independent of the previous split and independent of the number of splits.

$$w = c_1^N \rightarrow \left(\hat{K}, \hat{n}_0^{\hat{K}}, \hat{g}_1^{\hat{K}}\right) = \underset{K, n_0^K, g_1^K}{\operatorname{argmax}}\left\{ \xi^K \cdot \prod_{k=1}^{K} p\left(c_{n_{k-1}+1}^{n_k}, n_{k-1} g_1^K | K\right) \cdot p(n_k | n_{k-1}, K) \right\} \quad (8)$$

In some implementations, the decompounding engine uses dynamic programming to find the desired split sequence for a compound word source token. A cost function can determine a cost for each compound word split. The cost function can compute the total cost of the decompounded word from the individual cost for each component part (constituent). A dynamic program model based compound splitting process can use an auxiliary function, Q.

$$Q(c_1^j) = \underset{n_0^k, g_1^k}{\max}\left\{ \xi^K \cdot \prod_{k=1}^{K} p\left(c_{n_{k-1}+1}^{n_k}, n_{k-1} g_1^K\right) \right\} \text{ with } n_k = j \quad (9)$$

Therefore, $Q(c_1^j)$ is equal to the minimal costs (maximum probability) that the cost function assigns to the prefix string $c_1^j$ where the splitter uses K split points at positions $n_1^k$. This results in recursive Equation (10), $$Q(c_1^j) = \underset{n_k, g_k}{\max}\left\{ \xi \cdot Q(c_1^{n_k-1}) \cdot p\left(c_{n_{k-1}+1}^{n_k}, n_{k-1} g_1^K\right) \right\}, \quad (10)$$

A backpointer, B(j), is defined in Equation (11), $$B(j) = \underset{n_k, g_k}{\operatorname{argmax}}\left\{ \xi \cdot Q(c_1^{n_k-1}) \cdot p\left(c_{n_{k-1}+1}^{n_k}, n_{k-1} g_1^K\right) \right\}, \quad (11)$$

In Equation (11), $p(c_{n_{k-1}+1}^{n_k}, n_{k-1}, g_1^K)$ is the probability or cost function. By applying an inverse log to Equation (10) and Equation (11), the probability quantities can be interpreted as costs.

Figure 4:
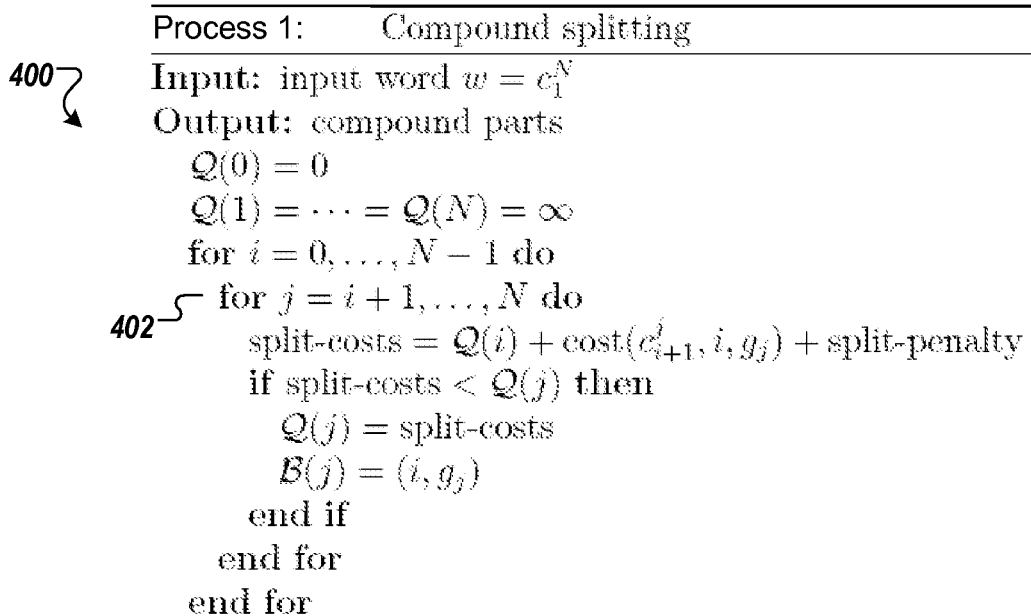
FIG. 4 shows a listing of an example dynamic program model based compound splitting process.

FIG. 4 shows a listing of an example dynamic program model based compound splitting process 400 (labeled process 1). The process 400 is quadratic in the length of the input string. In some implementations, "for" loop 402 is changed to:

"for j=i+1, . . . , min(i+l, N) do", where each constituent does not exceed a predefined length, l. As a result of this change, process 400 becomes linear in the length of the input word, O(|w|), because the length, l, is a predefined constant.

In some implementations, the performance of process 400 depends on the cost function, cost (•), or probability $p(c_{n_{k-1}+1}^{n_k}, n_{k-1}, g_1^K)$. Multiple knowledge sources can be used to model the probability. As described with reference to FIG. 1, a word frequency list (e.g., first partial vocabulary list 114) can associate a frequency count (e.g., frequency count 114c) with a potential constituent candidate (e.g., word 114b). The generation of appropriate candidates for transformed lexemes constituents, $g_k$, is described above with reference to the $PT_{CS}$ table.

If the dependency on $g_k$ is ignored, sub-words $c_{n_{k-1}+1}^{n_k}$ in the probability $p(c_{n_{k-1}+1}^{n_k}, n_{k-1}, •)$ can denote constituent candidates, which can be used to form the token, w. Constituent candidates, together with their associated frequency counts, can be extracted monolingually from a language model vocabulary list or bilingually from a phrase table. These extraction processes were previously described in this specification. Use of a zero order model for the constituent probability allows for the direct substitution of the constituent probabilities with the unigram counts (the frequency counts) provided by the language model vocabulary list. In this case, the normalization constant, constant split penalty, ξ, remains the same for each entry in the language model vocabulary list. Therefore, the normalization constant does not affect the constituent probability and can be omitted.

Figure 5:
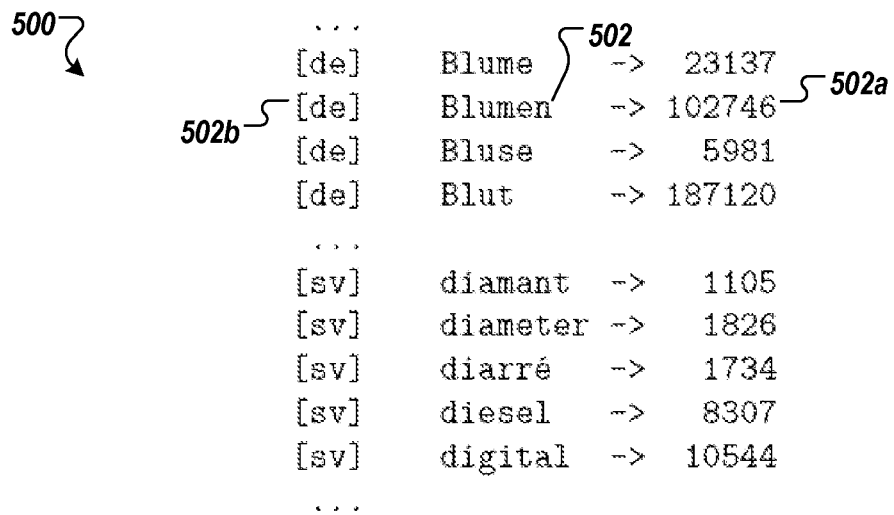
FIG. 5 shows a list of example lexemes extracted from a monolingual language model vocabulary list.

FIG. 5 shows a list 500 of example lexemes extracted from a monolingual language model vocabulary list. The list 500 includes a lexeme (e.g., lexeme 502), an associated frequency count for the lexeme (e.g., frequency count 502a) and a language code representing the language for the lexeme (e.g., language code 502b). Referring to FIG. 1, the list 500 can be included in a database (e.g., database 102) for use by a decompounding engine (e.g., decompounding engine 108) by a universal compound splitting system (e.g., system 100).

The dependency of the probability on the split position, $n_{k-1}$, indicates whether the dynamic program model based compound splitting process (e.g., process 400) is at the beginning, middle or end of the token, w. The process can then distinguish between start, linking, and end morphemes. As described with reference to FIG. 3, a universal compound splitting system can allow explicit setting of morphemes or automatic extraction of morphemes during a training procedure using a bilingual phase table.

The morpheme list 300 can include start, linking (e.g., morphemes 306) and end morphemes (e.g., morphemes 308) that can be used as prefix, infix or suffix, morphemes, respectively, to connect a sequence of constituents to form a compound word. A universal compound splitting system can detect the start, linking and end morphemes as prefix, infix or suffix morphemes, respectively, when decompounding a compound word. In some implementations, the universal compound splitting system delete or substitute one or more morphemes when decompounding a compound word.

Figure 6:
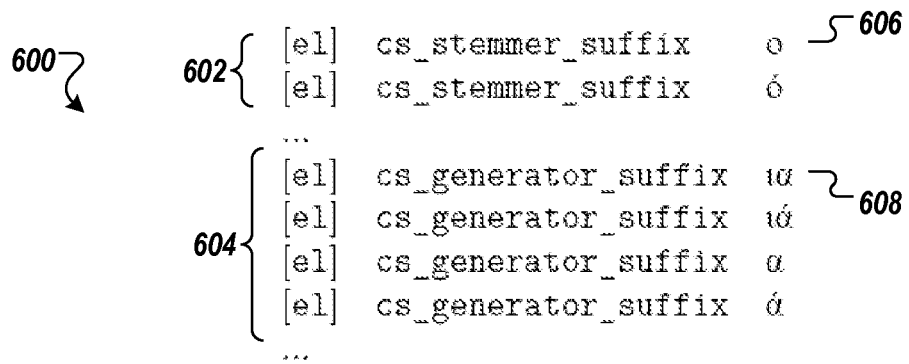
FIG. 6 shows a list of stemmer and generator end morphemes for the suffix of a constituent.

FIG. 6 shows a list 600 of stemmer 602 and generator 604 end morphemes for the suffix of a constituent. A universal compound splitting system can perform morpheme substitutions using stemmer and generator rules. The partial list 600 includes end morphemes for the Greek language (e.g., language code "el"). For example, a universal compound splitting system using a dynamic program model based compound splitting process decompounds the Greek word: χαρτοπαίζω (English translation: gamble) as shown below.

χαρτοπαίζω→χαρτιά+παίζω

In this example, the suffix, o, of the constituent, χαρτο, is stemmed with a stemmer suffix 606 (removing suffix "o") and replaced by a generator suffix 608 (adding "ιά"). In some implementations, the universal compound splitting system performs the deletion of a morpheme by applying a stemmer rule without the subsequent application of a generator rule. In some implementations, process 400 shown in FIG. 4 does not handle the direct transition between multiple morphemes, avoiding the generation of morpheme sequences. To achieve this, the costs of those morphemes that directly succeed another morpheme may be set as infinity.

In some implementations, a universal preprocessor included in a universal compound splitting system provides a customizable scorer interface to support multiple cost functions. For example, a specific scorer implements the scoring function that assigns costs to each of the constituents of a compound word. Additionally, the scorer interface can provide techniques for handling arbitrary morphological operations. Once the universal compound splitting system during a training procedure learns the morphological operations, the morphological operations can be included in morpheme lists (e.g., list 300, list 600).

Referring to FIGS. 1 and 4, to compute the cost function, cost $(c_{n_{k-1}+1}^{n_k}•)$ for process 400, the splitter 132 retrieves the word frequency of the constituent candidate $c_{n_{k-1}+1}^{n_k}$ from the word frequency list stored in database 102. For example, if the word frequency list includes approximately 100,000 entries per language with an average length of 20 bytes per word and a four byte integer value for storing the word frequency, the database 102 would require approximately 115 MBytes of storage to store information for the decompounding models to support 50 languages.

In some implementations, in order to reduce the amount of storage required for language related information, the universal compound splitting system computes a packed 64-bit fingerprint, reserving 40 bits for the word's fingerprint and 24 bits for the word's frequency. Therefore, the lookup table for the word frequency entries does not need to store the full words. The universal compound splitting system is interested in whether a particular compound candidate occurs in the word frequency list and does not need to retrieve the candidate itself. Therefore, it is sufficient to maintain a fingerprint for a word in the word frequency list. Using a 40-bit fingerprint reduces the number of collisions (same fingerprint for different words). Use of a 40-bit fingerprint results in a memory footprint of 19 Mbytes to support 50 languages, which is significantly less than the 115 MBytes needed to store full words in the word frequency list.

For example, the universal compound splitting system 100 in FIG. 1 attempts to split the English compound word: flowerpot. Referring to FIG. 1, the decompounding engine 108 receives the compound word. The splitter 132 can execute process 400 to try out every split point and decide on the compound split that results in the minimum costs according to a cost function. In this example, the compound word will be split into two parts. The splitter 132 positions two split points, where the number of split points is denoted by K (e.g., K=two) and the position of the split points in the compound word are denoted by $n_1$ and $n_2$. Since the compound word "flowerpot" consists of nine characters, $c_1, \ldots c_9$, there are eight possibilities for the position the split point $n_1$ within the characters $c_1, \ldots, c_8$. For example, if $n_1$=six, the constituent candidate ending in the sixth character is the first constituent "flower". The position of the split point $n_2$ is always the last character in the compound word. The position of the split point $n_2$ is fixed and can be set in advance where $n_2$=nine. Therefore, the remaining characters $c_7, \ldots, c_9$ form the second constituent "pot". Trying out all possible single splits in the compound word "flowerpot" results in the following constituent candidates:

flowerpot→f+lowerpot flowerpot→fl+owerpot flowerpot→flo+werpot

. . .

flowerpot→flower+pot

. . .

flowerpot→flowerpo+t

In determining if a constituent candidate is a constituent of the compound word "flowerpot", the splitter 132, e.g., using process 400, associates a cost with each constituent candidate using the frequency count for that candidate included in the word frequency list. The system determines a total cost for the constituent candidates for the decompounding of the compound word by summing the cost of each constituent candidate. For example, the single letter "f" may occur frequently contributing a small cost (high probability) to the total cost for decompounding the compound word but the word "lowerpot" most likely does not occur at all contributing a high cost (low probability) to the total cost for decompounding the compound word. Therefore, the split of "flowerpot" into "f" and "lowerpot" is unlikely.

In another example, the constituent "flower" occurs frequently in the English language contributing a small cost (high probability) to the total cost for decompounding the compound word and the constituent "pot" also occurs frequently in the English language contributing an additional small cost (high probability) to the total cost for decompounding the compound word. The system can determine that the cost for this split is the lowest and therefore the constituents are the constituents of the compound word. The desired position for the split point $n_1$ is equal to six.

In another example, the universal compound splitting system attempts to split the German compound word "Verkehrszeichen" (English translation: traffic sign). In the example of the splitting of the English compound word "flowerpot" into two constituents, the compound word consisted of two concatenated dictionary words. However, the German compound word "Verkehrszeichen" consists of two constituent dictionary words with a s morpheme, i.e., a linking morpheme, between the two sub-words. The system (e.g., a decompounding engine) receives the compound word. The system (e.g., using a splitter) can try out every possible split point and decide for the compound split that results in the minimum costs according to a cost function (e.g., using process 400). In this example, the compound word will be split into three parts, K=three. Trying out all possible double splits in the compound word "Verkehrszeichen" results in the following constituent candidates:

Verkehrszeichen→V+e+rkehrszeichen

Verkehrszeichen→V+er+kehrszeichen

Verkehrszeichen→V+erk+ehrszeichen

. . .

Verkehrszeichen→Verkehr+s+zeichen

. . . .

Verkehrszeichen→Verkehrszeich+e+n

The system (e.g., using the splitter) looks up each potential constituent in the word frequency list to determine its frequency. The system determines the desired split points by determining the compound word split with the lowest cost (highest probability). This results in the desired compound word split being at positions for the split points of $n_1$=seven, $n_2$=eight, and $n_3$=fifteen. In this example, the additional s morpheme is a linking morpheme as it links the constituents Verkehr and zeichen. In some implementations, the system includes a list of all possible linking morphemes (e.g., list 300). The system can hypothesize the possible linking morphemes to insert between the two constituents.

For example, the universal compound splitting system attempts to split the Greek compound word "χαρτόκουτο" (English translation: cardboard box). In the example of splitting the German compound word "Verkehrszeichen", the system inserted a linking morpheme between the two constituents. The first constituent "χαρτό" of the Greek compound word can be found in a Greek dictionary. The second constituent "κOUτο" is not a valid Greek word and cannot be found in a Greek dictionary.

Additionally, though the first constituent "χαρτό" is found in a Greek dictionary, the more commonly found form of the constituent is "χαρτί ί". The system (e.g., using a decompounding engine) can perform one or more morpheme substitutions. Specifically, a transformation module in the decompounding engine can substitute the suffix of one or more of the constituent candidates with a morpheme, performing a morphological operation, $g_k$, resulting in a transformed constituent candidate. The decompounding engine can lookup the transformed constituent candidate in the word frequency list and determine its frequency count. The splitter can try out every split point and decide for the compound split that results in the minimum costs according to a cost function (e.g., according to process 400). In this example, the compound word will be split into two parts.

The splitter can try out all possible double splits in the compound word "χαρτόκουτο" and can perform various morphological operations, $g_k$, on the one or more constituent candidates to transform a candidate from a non-dictionary word to a dictionary word. This results in the following constituent candidates and morphological operations, $g_k$.

| | |
|---|---|
| ΧαρΤΟΚΟUΤΟ → X + αρΤΟΚΟUΤΟ | |
| ΧαρΤΟΚΟUΤΟ → X + αρΤΙΚΟUΤΟ | $g_1$: Ó/Í |
| ΧαρΤΟΚΟUΤΟ → X + αρΤΟΚΟUΤΙ | $g_2$: O/Í |
| . . . | |
| ΧαρΤΟΚΟUΤΟ → ΧαρΤΙ + ΚΟUΤΙ | $g_1$: Ó/Í, $g_2$: O/Í |
| . . . | |
| ΧαρΤΟΚΟUΤΟ → ΧαρΤΙΚΟUΤ + O | $g_1$: Ó/Í |
| ΧαρΤΟΚΟUΤΟ → ΧαρΤΙΚΟUΤ + Í | $g_2$: O/Í |

Depending on the language, the morphological operations, $g_k$, can become arbitrarily complex. Additionally, it may not be feasible to list all morphological operations explicitly for every language. Therefore, using a training procedure, morphological operations can be found and provided as an additional knowledge source to a universal compound splitting system.

Figure 7:
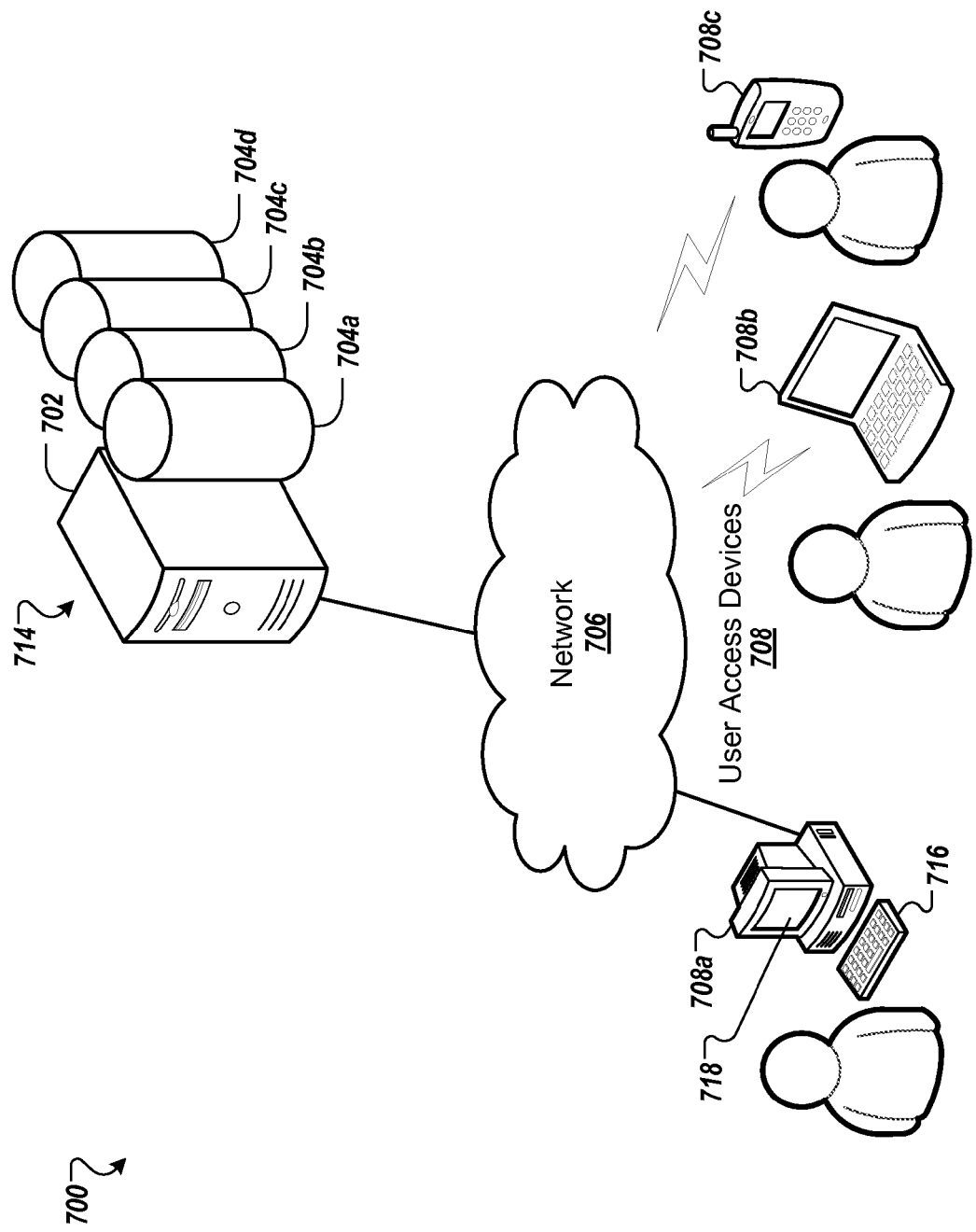
FIG. 7 is a diagram of an example of a network architecture that can be used in accordance with implementations of the present disclosure.

FIG. 7 is a diagram of an example of a network architecture 700 that can be used in accordance with implementations of the present specification. All of the elements are coupled to a network 706. Each of the devices 708, 714 in FIG. 7 may be implemented or associated with hardware components, software components, or firmware components, or any combination of such components. For example, the devices 708, 714 may be implemented or associated with general purpose servers, software processes and engines, and/or various embedded systems.

The architecture 700 includes one or more user access devices 708 (user access device 708a, user access device 708b, user access device 708c) and a computer system 714. The computer system 714 includes a server 702 and databases 704a, 704b, 704c, 704d. In some implementations, the architecture 700 represents a client/server system supporting multiple computer systems including one or more clients (e.g., user access device 708a can serve as a client) and/or one or more servers (e.g., server 702) that are connectively coupled for communication with one another over a network 706. In some implementations, the clients are directly connected to the one or more servers (without connecting by way of network 706).

The user access devices 708 may include devices capable of receiving information from the network 706. The user access devices 708 can represent various forms of processing devices including, but not limited to, a general purpose computer, a special purpose computer, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. In addition, each user access devices 708 may access application software on the server 702.

The server 702 can represent various forms of servers including, but not limited to, a web server, an application server, a proxy server, a network server, or a server farm. For example, the server 702 can be an application server that executes software accessed by user access devices 708. In operation, multiple user access devices 708 can communicate with the server 702 by way of network 706. In some implementations, architecture 700 may enable a user to invoke applications available on the server 702 using a web browser running on one of the user access devices 708. Each application can individually access data from one or more repository resources (e.g., databases 704a, 704b, 704c, 704d). For example, the server 702 accesses databases 704a, 704b, 704c, 704d.

In some implementations, the user access devices 708 communicate wirelessly through a communication interface (not shown), which may include digital signal processing circuitry where necessary. The communication interface may provide for communications under various modes or protocols, such as Global System for Mobile Communications (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Private Data Channel (PDC), Wideband Code Division Multiple Access (WCDMA), Code Division Multiple Access 2000 (CDMA2000), or General Packet Radio Service (GPRS), among others. For example, the communication may occur through a radio-frequency transceiver (not shown). In addition, short-range communication may occur, such as using a Bluetooth (e.g., IEEE 802.15x), WiFi (e.g., 802.11x), or other such transceivers.

In some implementations, the architecture 700 is a distributed client/server system that spans one or more networks such as network 706. The network 706 can be a large computer network, such as a local area network (LAN), wide area network (WAN), the Internet, a cellular network, or a combination thereof connecting any number of mobile clients, fixed clients, and servers. In some implementations, each of the user access devices 708 communicates with the server 802 using a virtual private network (VPN), Secure Shell (SSH) tunnel, or other secure network connection. In some implementations, the network 806 includes the Internet, a wireless service network and may include the Public Switched Telephone Network (PSTN). In other implementations, the network 106 includes a corporate network (e.g., an intranet) and one or more wireless access points.

Each of the user access devices 708 can establish its own session with the server 702. Each session can be semi-permanent as it can be established at one point in time and torn down at another. Each session can involve two-way information exchange between the computer system 714 and each individual user access device. For example, a Hypertext Transfer Protocol (HTTP) session enables the association of information with individual users. One or more of the user access devices 708 can communicate via network 706 with the server 702. In order to run an application, each user access device can establish a corresponding session with the application server 702.

For example, a user, using user access device 708a, can establish a communication session the server 702 by way of network 706. The server can include a universal compound splitting system (e.g., the universal compound splitting system 100 described in FIG. 1). The user can enter a compound word for translation, using keyboard 716, in a graphical user interface (GUI) displayed on display device 718. Responsive to the activation, by the user, of a translate button included in the GUI, the user access device 708a transmits the compound word to the computing system 714 by way of network 706. Referring to FIG. 1, the server 702 that includes the universal compound splitting system 100 receives the compound word and inputs the compound word into the input string module 122. The universal compound splitting system 100 then performs a decompounding and translation process on the input compound word as described previously in this specification. While performing this process, the system 100 may access the one or more databases 704a, 704b, 704c, 704d that can represent databases 102, 104, 106 and 128. The system 100, as well as the computing device 714, can include additional databases as needed by a universal compound splitting system. The translation engine 142 outputs the translated output string 144. The server 702, by way of network 706, transmits the translated output string 144 to the user access device 708a for display to the user in the GUI on display device 818.

Figure 8:
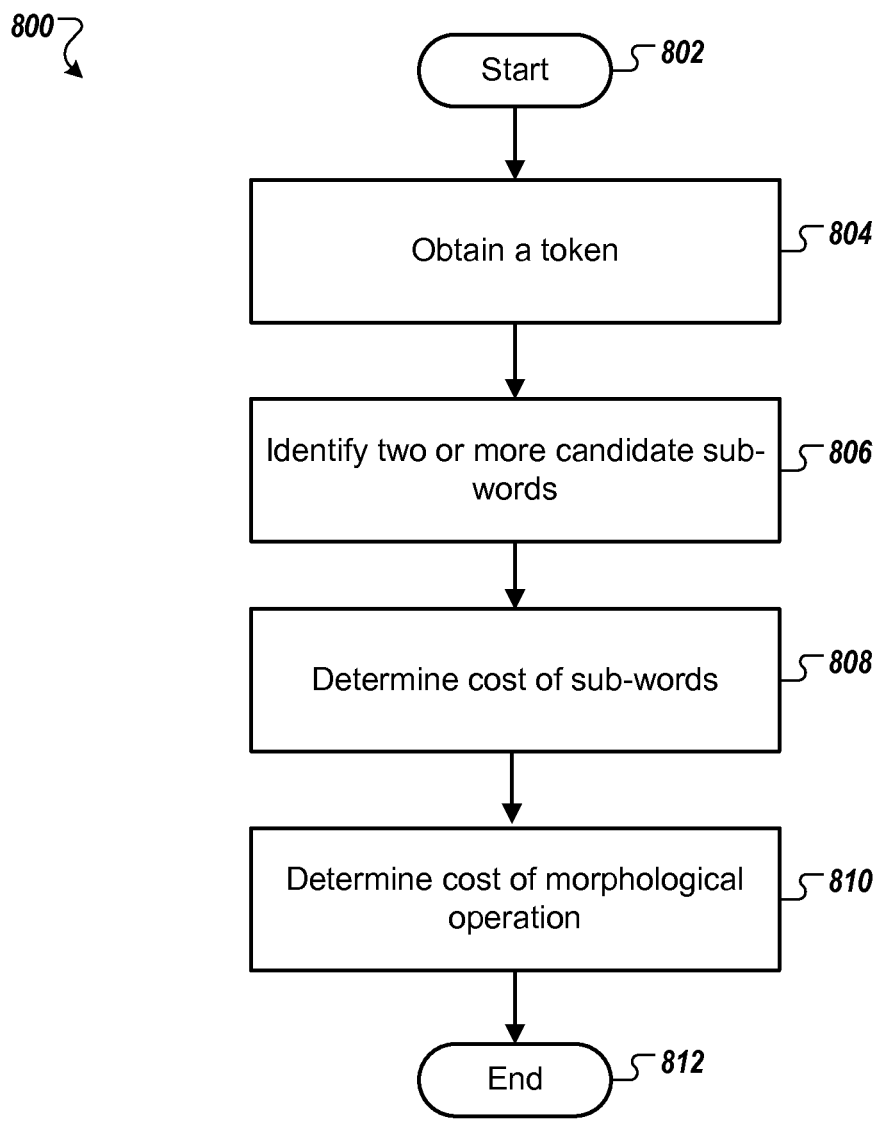
FIG. 8 is a flow chart of an example decompounding process.

FIG. 8 is a flow chart of an example decompounding process 800. The process 800 will be described with respect to a system that performs the process 800. For example, the universal compound splitting system 100 of FIG. 1, specifically the decompounding engine 108, can be used to execute the process 800.

The process 800 begins (802) when the system obtains a token (804). For example, the system can obtain the token through an input string module (e.g., input string module 122 that obtains input string 126). Additionally, a decompounding engine (e.g., decompounding engine 108) can receive the token from the input string module. The system identifies two or more candidate sub-words included in the token (806). For example, the decompounding engine can use the process 400 of FIG. 4 to identify candidate sub-words for the obtained token. The system (e.g., the decompounding engine) identifies one or more morphological operations (808). The system can use the one or more morphological operations in the decompounding process. The system (e.g., using a cost module), determines the cost of each candidate sub-word (810). Additionally, the system determines the cost of each morphological operation (812). The system can then use the determined costs for each candidate sub-word to decompound the token. The process ends (816).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A system comprising:
   one or more computers and one or more storage devices storing instructions that when executed by the one or more computers cause the one or more computers to perform operations comprising:
   obtaining a token that comprises a sequence of characters in a source language,
   identifying (i) two or more candidate sub-words that are constituents of the token, and (ii) one or more morphological operations that are required to transform the candidate sub-words into the token, wherein at least one of the morphological operations involves a use of a non-dictionary word,
   determining a cost associated with each candidate sub-word and a cost associated with each morphological operation,
   performing a dynamic program model-based compound splitting process to selectively decompound the token into the candidate sub-words based on the costs to obtain one or more words, including:
   utilizing a recursive function to determine minimal costs for a number of split points in the token, and
   selectively decompounding the token into candidate sub-words having the minimal costs to obtain the one or more words; and
   performing phrase-based statistical machine translation (SMT) of the one or more words from the source language to a different target language,
   wherein the recursive function is:

$$Q(c_1^j) = \max_{n_k, g_k} \{\xi \cdot Q(c_1^{n_k-1}) \cdot p(c_{n_{k-1}+1}^{n_k}, n_{k-1}g_1^K)\},$$

where $Q(c_1^j)$ represents the minimal costs that a cost function $p(c_{n_{k-1}+1}^{n_k}, n_{k-1}g_1^K)$ assigns to a character string $c_1^j$ when the dynamic program model-based compound splitting process uses K split points at positions $n_1^k$, where $\xi$ represents a constant split penalty, and where $g_1^K$ represents transformed lexemes from non-dictionary words.

2. The system of claim 1, wherein the operations further comprise combining the cost associated with each sub-word with the cost associated with each morphological operation.

3. The system of claim 2, wherein selectively decompounding the token into the candidate sub-words is performed based on the combined costs.

4. The system of claim 3, wherein determining the cost further comprises selecting a custom scoring function, from among multiple scoring functions, that assigns costs to the sub-words.

5. The system of claim 1, wherein each of the at least one morphological operations is selected from a group consisting of inserting the non-dictionary word between two of the candidate sub-words, deleting of the non-dictionary word from the token, prepending the non-dictionary word as a prefix of one or more of the candidate sub-words, postpending the non-dictionary word as a suffix of one or more of the candidate sub-words, or inserting the non-dictionary word as an infix to one or more of the candidate sub-words.

6. The system of claim 1, wherein the non-dictionary word is a linking morpheme.

7. The system of claim 1, wherein the non-dictionary word includes a sub-sequence of the characters that has no defined meaning in the language of the sub-words.

8. A computer-implemented method comprising:
   obtaining a token that comprises a sequence of characters in a source language;
   identifying (i) two or more candidate sub-words that are constituents of the token, and (ii) one or more morphological operations that are required to transform the candidate sub-words into the token, wherein at least one of the morphological operations involves a use of a non-dictionary word;
   determining, by one or more computers, a cost associated with each candidate sub-word and a cost associated with each morphological operation;
   performing a dynamic program model-based compound splitting process to selectively decompound the token into the candidate sub-words based on the costs to obtain one or more words, including:
   utilizing a recursive function to determine minimal costs for a number of split points in the token, and
   selectively decompounding the token into candidate sub-words having the minimal costs to obtain the one or more words; and
   performing phrase-based statistical machine translation (SMT) of the one or more words from the source language to a different target language, wherein the recursive function is:

$$Q(c_1^j) = \max_{n_k, g_k}\{\xi \cdot Q(c_1^{n_{k-1}}) \cdot p(c_{n_{k-1}+1}^{n_k}, n_{k-1}g_1^K)\},$$

where $Q(c_1^j)$ represents the minimal costs that a cost function $$p(c_{n_{k-1}+1}^{n_k}, n_{k-1}g_1^K)$$

assigns to a character string $c_1^j$ when the dynamic program model-based compound splitting process uses K split points at positions $n_1^k$, where $\xi$ represents a constant split penalty, and where $g_1^K$ represents transformed lexemes from non-dictionary words.

9. A non-transitory computer storage medium encoded with a computer program, the program comprising instructions that when executed by data processing apparatus cause the data processing apparatus to perform operations comprising:
   obtaining a token that comprises a sequence of characters in a source language;
   identifying (i) two or more candidate sub-words that are constituents of the token, and (ii) one or more morphological operations that are required to transform the candidate sub-words into the token, wherein at least one of the morphological operations involves a use of a non-dictionary word;
   determining a cost associated with each candidate sub-word and a cost associated with each morphological operation;
   performing a dynamic program model-based compound splitting process to selectively decompound the token into the candidate sub-words based on the costs to obtain one or more words, including:
      utilizing a recursive function to determine minimal costs for a number of split points in the token, and
      selectively decompounding the token into candidate sub-words having the minimal costs to obtain the one or more words; and
   performing phrase-based statistical machine translation (SMT) of the one or more words from the source language to a different target language,
   wherein the recursive function is:

$$Q(c_1^j) = \max_{n_k, g_k}\{\xi \cdot Q(c_1^{n_{k-1}}) \cdot p(c_{n_{k-1}+1}^{n_k}, n_{k-1}g_1^K)\},$$

where $Q(c_1^j)$ represents the minimal costs that a cost function $$p(c_{n_{k-1}+1}^{n_k}, n_{k-1}g_1^K)$$

assigns to a character string $c_1^j$ when the dynamic program model-based compound splitting process uses K split points at positions $n_1^k$, where $\xi$ represents a constant split penalty, and where $g_1^K$ represents transformed lexemes from non-dictionary words.

10. A system comprising:
one or more computers and one or more storage devices storing instructions that when executed by the one or more computers cause the one or more computers to perform operations comprising:
   identifying words that occur in a first vocabulary, and a frequency with which each respective word occurs in the first vocabulary,
   performing a dynamic program model-based compound splitting process to selectively decompound words that occur in a second vocabulary using one or more of the words that occur in the first vocabulary as constituents based on their corresponding frequencies, including:
      utilizing a recursive function to determine maximum frequencies for a number of split points in the words that occur in the second vocabulary, and
      selectively decompounding the words that occur in the second vocabulary using one or more of the words that occur in the first vocabulary as constituents, the one or more words having the maximum frequencies, and
   outputting, as a universal compound splitter vocabulary, the one or more of the words that occur in the first vocabulary that were used as constituents to decompound the words that occur in the second vocabulary,
   wherein the universal compound splitter vocabulary is a single shard table configured for storage in a database and that includes one or more entries and corresponding language codes for each language supported by the universal compound splitter vocabulary, and
   wherein the recursive function is:

$$Q(c_1^j) = \max_{n_k, g_k}\{\xi \cdot Q(c_1^{n_{k-1}}) \cdot p(c_{n_{k-1}+1}^{n_k}, n_{k-1}g_1^K)\},$$

where $Q(c_1^j)$ represents the minimal costs that a cost function $$p(c_{n_{k-1}+1}^{n_k}, n_{k-1}g_1^K)$$

assigns to a character string $c_1^j$ when the dynamic program model-based compound splitting process uses K split points at positions $n_1^k$, where $\xi$ represents a constant split penalty, and where $g_1^K$ represents transformed lexemes from non-dictionary words.

11. The system of claim 10, wherein the first vocabulary comprises at least one of a news language model vocabulary and a web language model vocabulary.

12. The system of claim 10, wherein the operations further comprise selecting the one or more of the words that occur in the first vocabulary that were used as constituents more than a predetermined number of times to decompound the words that occur in the second vocabulary to obtain selected words; and
   wherein outputting, as the universal compound splitter vocabulary, the one or more of the words that occur in the first vocabulary that were used as constituents to decompound the words that occur in the second vocabulary further comprises outputting the selected words that occur in the first vocabulary that were used as constituents more than a predetermined number of times to decompound the words that occur in the second vocabulary.

13. The system of claim 10, wherein the operations further comprise filtering words from the universal compound splitter vocabulary based on the frequency with which each respective word occurs in the first vocabulary.

14. The system of claim 10, wherein the universal compound splitter vocabulary is a monolingual or multilingual vocabulary.

15. The system of claim 10, wherein the first vocabulary and the second vocabulary include words from a single language only.

16. A non-transitory computer storage medium encoded with a computer program, the program comprising instructions that when executed by data processing apparatus cause the data processing apparatus to perform operations comprising:
- identifying words that occur in a first vocabulary, and a frequency with which each respective word occurs in the first vocabulary;
- performing a dynamic program model-based compound splitting process to selectively decompound words that occur in a second vocabulary using one or more of the words that occur in the first vocabulary as constituents based on their corresponding frequencies, including:
  - utilizing a recursive function to determine maximum frequencies for a number of split points in the words that occur in the second vocabulary, and
  - selectively decompounding the words that occur in the second vocabulary using one or more of the words that occur in the first vocabulary as constituents, the one or more words having the maximum frequencies; and
- outputting, as a universal compound splitter vocabulary, the one or more of the words that occur in the first vocabulary that were used as constituents to decompound the words that occur in the second vocabulary,
- wherein the universal compound splitter vocabulary is a single shard table that is configured for storage in a database and that includes one or more entries and corresponding language codes for each language supported by the universal compound splitter vocabulary,
- wherein the recursive function is:

$$Q(c_1^j) = \max_{n_k, g_k} \{\xi \cdot Q(c_1^{n_{k-1}}) \cdot p(c_{n_{k-1}+1}^{n_k}, n_{k-1}g_1^K)\},$$

where $Q(c_1^j)$ represents the minimal costs that a cost function $$p(c_{n_{k-1}+1}^{n_k}, n_{k-1}g_1^K)$$

assigns to a character string $c_1^j$ when the dynamic program model-based compound splitting process uses K split points at positions $n_1^k$, where $\xi$ represents a constant split penalty, and where $g_1^K$ represents transformed lexemes from non-dictionary words.

17. A computer-implemented method comprising:
- identifying words that occur in a first vocabulary, and a frequency with which each respective word occurs in the first vocabulary;
- performing a dynamic program model-based compound splitting process to selectively decompound, by one or more computers, words that occur in a second vocabulary using one or more of the words that occur in the first vocabulary as constituents based on their corresponding frequencies, including:
  - utilizing a recursive function to determine maximum frequencies for a number of split points in the words that occur in the second vocabulary, and
  - selectively decompounding the words that occur in the second vocabulary using one or more of the words that occur in the first vocabulary as constituents, the one or more words having the maximum frequencies; and
- outputting, as a universal compound splitter vocabulary, the one or more of the words that occur in the first vocabulary that were used as constituents to decompound the words that occur in the second vocabulary,
- wherein the universal compound splitter vocabulary is a single shard table that is configured for storage in a database and that includes one or more entries and corresponding language codes for each language supported by the universal compound splitter vocabulary,
- wherein the recursive function is:

$$Q(c_1^j) = \max_{n_k, g_k} \{\xi \cdot Q(c_1^{n_{k-1}}) \cdot p(c_{n_{k-1}+1}^{n_k}, n_{k-1}g_1^K)\},$$

where $Q(c_1^j)$ represents the minimal costs that a cost function $$p(c_{n_{k-1}+1}^{n_k}, n_{k-1}g_1^K)$$

assigns to a character string $c_1^j$ when the dynamic program model-based compound splitting process uses K split points at positions $n_1^k$, where $\xi$ represents a constant split penalty, and where $g_1^K$ represents transformed lexemes from non-dictionary words.

18. A non-transitory computer storage medium encoded with a computer program, the program comprising instructions that when executed by data processing apparatus cause the data processing apparatus to perform operations comprising:
- identifying words that occur in a first vocabulary, and a frequency with which each respective word occurs in the first vocabulary;
- decompounding words that occur in a second vocabulary using one or more of the words that occur in the first vocabulary as constituents based on their corresponding frequencies;
- outputting, as a universal compound splitter vocabulary, the one or more of the words that occur in the first vocabulary that were used as constituents to decompound the words that occur in the second vocabulary, wherein the universal compound splitter vocabulary is a single shard table that is configured for storage in a database and that includes one or more entries and corresponding language codes for each language supported by the universal compound splitter vocabulary;
- obtaining a token that comprises a sequence of characters in a source language,
- identifying (i) two or more candidate words that occur in the universal compound splitter vocabulary and that are constituents of the token, and (ii) one or more morphological operations that are required to transform the candidate words into the token, wherein at least one of the morphological operations involves a use of a non-dictionary word,
- determining a cost associated with each candidate word and a cost associated with each morphological operation, wherein the cost associated with each word corresponds with the frequency with which the respective word occurs in the first vocabulary,
- performing a dynamic program model-based compound splitting process to selectively decompound the token into the two or more candidate words based on the costs to obtain one or more words, including:
  - utilizing a recursive function to determine minimal costs for a number of split points in the token, and
  - selectively decompounding the token into the two or more candidate sub-words having the minimal costs to obtain the one or more words; and
- performing phrase-based statistical machine translation (SMT) of the one or more words from the source language to a different target language, wherein the recursive function is:

$$Q(c_1^j) = \max_{n_k, g_k} \{\xi \cdot Q(c_1^{n_{k-1}}) \cdot p(c_{n_{k-1}+1}^{n_k}, n_{k-1}g_1^K)\},$$

where $Q(c_1^j)$ represents the minimal costs that a cost function $$p(c_{n_{k-1}+1}^{n_k}, n_{k-1}g_1^K)$$

assigns to a character string $c_1^j$ when the dynamic program model-based compound splitting process uses K split points at positions $n_1^k$, where $\xi$ represents a constant split penalty, and where $g_1^K$ represents transformed lexemes from non-dictionary words.

19. A computer-implemented method, comprising:
receiving, at a computing device having one or more processors, a word for translation from a source language to a target language;
determining, at the computing device, one or more sets of components of the word, each component including one character of the word or two or more consecutive characters of the word, each set of components collectively corresponding to the word;
determining, at the computing device, a first cost for each set of components, wherein each first cost indicates a frequency of components of a corresponding set of components occurring in the source language;
determining, at the computing device, a morphological operation for each of the one or more sets of components, wherein a specific morphological operation is configured to transform components of a specific set of components into the word;
determining, at the computing device, a second cost for each morphological operation, wherein a specific second cost is based on an edit distance of a specific morphological operation;
determining, at the computing device, a combined cost for each set of components based on its first and second costs;
performing, at the computing device, a dynamic program model-based compound splitting process to selectively decompound the word into components of a specific set of components having a lowest combined cost to obtain selected components; and
performing statistical machine translation (SMT) to translate the selected components from the source language to the target language,
wherein performing the dynamic program model-based compound splitting process includes utilizing a recursive function to determine the lowest combined cost for a number of split points to obtain the components of a set of components, and
wherein the recursive function is:

$$Q(c_1^j) = \max_{n_k, g_k} \{\xi \cdot Q(c_1^{n_{k-1}}) \cdot p(c_{n_{k-1}+1}^{n_k}, n_{k-1}g_1^K)\},$$

where $Q(c_1^j)$ represents the minimal costs that a cost function $$p(c_{n_{k-1}+1}^{n_k}, n_{k-1}g_1^K)$$

assigns to a character string $c_1^j$ when the dynamic program model-based compound splitting process uses K split points at positions $n_1^k$, where $\xi$ represents a constant split penalty, and where $g_1^K$ represents transformed lexemes from non-dictionary words.

* * * * *